(12) United States Patent
Suzuki

(10) Patent No.: US 11,211,092 B2
(45) Date of Patent: Dec. 28, 2021

(54) METHOD OF INSPECTING MAGNETIC RECORDING TAPE USING IMAGE SENSOR

(71) Applicant: NEC Platforms, Ltd., Kawasaki (JP)

(72) Inventor: Mitsunori Suzuki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/981,537

(22) PCT Filed: Mar. 13, 2019

(86) PCT No.: PCT/JP2019/010225
§ 371 (c)(1),
(2) Date: Sep. 16, 2020

(87) PCT Pub. No.: WO2019/188279
PCT Pub. Date: Oct. 3, 2019

(65) Prior Publication Data
US 2021/0304794 A1     Sep. 30, 2021

(30) Foreign Application Priority Data

Mar. 29, 2018  (JP) .............................. JP2018-065058

(51) Int. Cl.
*G11B 15/093* (2006.01)
*G11B 5/008* (2006.01)
(Continued)

(52) U.S. Cl.
CPC ........ *G11B 15/093* (2013.01); *G11B 5/00813* (2013.01); *G11B 5/00878* (2013.01);
(Continued)

(58) Field of Classification Search
None
See application file for complete search history.

(56) References Cited

U.S. PATENT DOCUMENTS 5,428,452 A * 6/1995 Grycewicz ......... G01N 21/8916
356/430
5,876,270 A * 3/1999 Honma .................... G11B 5/84
451/59
(Continued)

FOREIGN PATENT DOCUMENTS

JP    2000-322737 A    11/2000
JP    2001-184603 A     7/2001
(Continued)

OTHER PUBLICATIONS

International Search Report for PCT Application No. PCT/JP2019/010225, dated Apr. 16, 2019.
(Continued)

*Primary Examiner* — Tan X Dinh
(74) *Attorney, Agent, or Firm* — Sughrue Mion, PLLC

(57) ABSTRACT

A magnetic tape device (100) includes: a winding reel (101) winding a magnetic tape (201); a drive head (103) performing writing information onto the magnetic tape (201) and/or reading the information recorded on the magnetic tape (201); an image sensor (104) picking up an image of a surface of the magnetic tape (201); and a control unit (105) performing image processing on the image picked up the image sensor (104) and determining presence/absence of an abnormality on the surface of the magnetic tape (201), in which the control unit (105) adjusts, in accordance with at least either one of a type of the drive head (103) and a recording density of the magnetic tape (201), a winding speed at which the magnetic tape (201) is wound by the winding reel (101) when the image sensor (104) picks up the image of the surface of the magnetic tape (201).

15 Claims, 4 Drawing Sheets

(51) Int. Cl.
  *G11B 5/584* (2006.01)
  *G11B 5/588* (2006.01)

(52) U.S. Cl.
  CPC .......... *G11B 5/00882* (2013.01); *G11B 5/584* (2013.01); *G11B 5/588* (2013.01)

(56) References Cited

U.S. PATENT DOCUMENTS

| | | | |
|---|---|---|---|
| 9,653,114 B1 * | 5/2017 | Biskeborn | G11B 5/3133 |
| 9,728,222 B1 * | 8/2017 | Biskeborn | G11B 5/00813 |
| 10,896,696 B2 * | 1/2021 | Asmussen | G11B 20/1816 |
| 2003/0103659 A1 | 6/2003 | Hara et al. | |
| 2004/0101173 A1 | 5/2004 | Hara et al. | |
| 2007/0025009 A1 * | 2/2007 | Tarumi | G11B 5/56 360/69 |
| 2012/0229931 A1 | 9/2012 | Katagiri et al. | |

FOREIGN PATENT DOCUMENTS

| | | | |
|---|---|---|---|
| JP | 2003-173445 A | | 6/2003 |
| JP | 3444253 B2 | | 9/2003 |
| JP | 2004-078434 A | | 3/2004 |
| JP | 2004-191370 A | | 7/2004 |
| JP | 2008140504 A | * | 6/2008 |
| JP | 2009-064489 A | | 3/2009 |
| JP | 2013-206501 A | | 10/2013 |
| WO | 2011/077798 A1 | | 6/2011 |
| WO | 2015/156084 A1 | | 10/2015 |

OTHER PUBLICATIONS

Japanese Office Action for JP Application No. 2018-065058 dated Jan. 7, 2020 with English Translation.
Japanese Office Action for JP Application No. 2018-065058 dated Aug. 6, 2019 with English Translation.

* cited by examiner

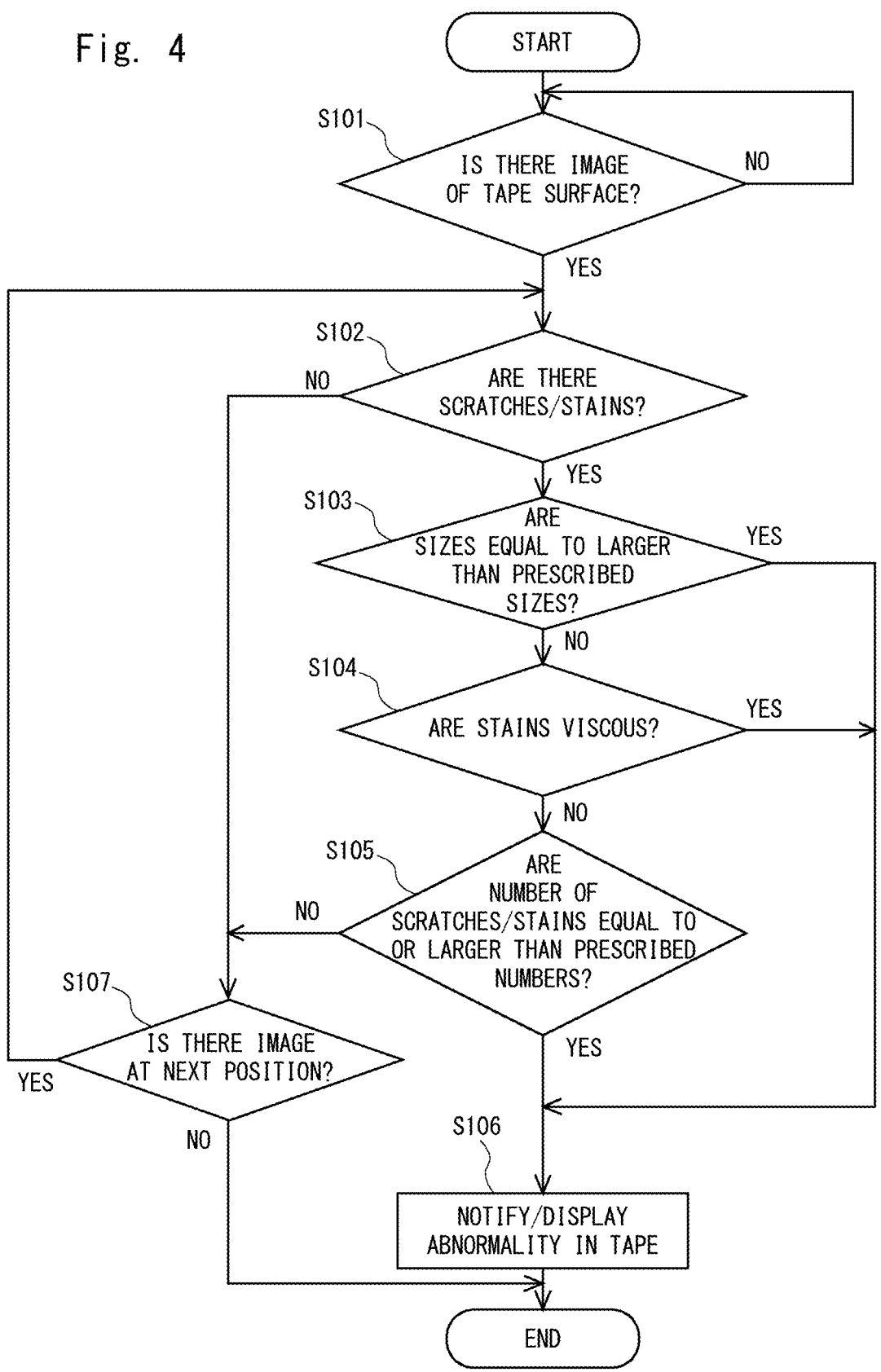

METHOD OF INSPECTING MAGNETIC RECORDING TAPE USING IMAGE SENSOR

This application is a National Stage Entry of PCT/JP2019/010225 filed on Mar. 13, 2019, which claims priority from Japanese Patent Application 2018-065058 filed on Mar. 29, 2018, the contents of all of which are incorporated herein by reference, in their entirety.

TECHNICAL FIELD

The present disclosure relates to a magnetic tape device, a method of inspecting a magnetic tape, and a non-transitory computer readable medium.

BACKGROUND ART

A magnetic tape device writes information on a magnetic tape and reads information recorded on the magnetic tape. When the installation environment or the operation method of the magnetic tape device is poor, a media error, in which writing on and reading from the magnetic tape cannot be performed, may occur repeatedly. The media error depends on the state of the tape and the state of the drive head, and it is caused depending on a combination of a certain state of the tape and a certain state of the drive head. Therefore, there is a problem that it is difficult to determine, under the user's environment where the magnetic tape device is installed, which of the state of the magnetic tape or the state of the drive head is the cause of the error.

Patent Literature 1 discloses a magnetic tape device including a tape monitoring mechanism that observes a recording surface of the magnetic tape and detects scratches and stains of the tape.

CITATION LIST

Patent Literature

Patent Literature 1: Japanese Patent No. 3444253

SUMMARY OF INVENTION

Technical Problem

When a magnetic tape device is equipped with a DAT (Digital Audio Tape) drive or the like of a relatively slow tape speed of around 1 cm/second at the time of reading/writing, it is possible to detect scratches and stains of the tape with a normal image sensor disclosed in Patent Literature 1. However, when a magnetic tape device is equipped with a LTO (Linear Tape-Open) drive or the like of a relatively fast tape speed of around 4 m/second to 9 m/second at the time of reading/writing, it is difficult to detect scratches and stains with a normal image sensor. Further, since the sizes of the scratches and the stains that cause errors become small as the recording density of the magnetic tape improves, it is necessary to detect such scratches and stains of smaller sizes.

An object of the present disclosure is to provide a magnetic tape device capable of detecting a state of a magnetic tape more accurately, a method of inspecting a magnetic tape, and a non-transitory computer readable medium.

Solution to Problem

A magnetic tape device according to a first aspect includes: a winding unit configured to wind a magnetic tape; a drive head configured to perform at least either one of writing information onto the magnetic tape and reading the information recorded on the magnetic tape; a sensor unit configured to pick up an image of a surface of the magnetic tape; and a control unit configured to perform image processing on the image picked up by the sensor unit and to determine presence/absence of an abnormality on the surface of the magnetic tape, in which the control unit adjusts, in accordance with at least either one of a type of the drive head and a recording density of the magnetic tape, a winding speed at which the magnetic tape is wound by the winding unit when the sensor unit picks up the image of the surface of the magnetic tape.

A method of inspecting a magnetic tape according to a second aspect includes:
winding a magnetic tape;
picking up an image of a surface of the magnetic tape;
performing image processing on the picked-up image and determining presence/absence of an abnormality on the surface of the magnetic tape; and
adjusting, in accordance with at least either one of a type of a drive head and a recording density of the magnetic tape, a winding speed at which the magnetic tape is wound when picking up the image of the surface of the magnetic tape.

A non-transitory computer readable medium according to a third aspect configured to store a program for causing a control unit to execute the processes of:
winding a magnetic tape by a winding unit;
picking up an image of a surface of the magnetic tape by a sensor unit;
performing image processing on the image picked up by the sensor unit and determining presence/absence of an abnormality on the surface of the magnetic tape; and
adjusting, in accordance with at least either one of a type of a drive head and a recording density of the magnetic tape, a winding speed at which the magnetic tape is wound by the winding unit when the sensor unit picks up the image of the surface of the magnetic tape.

Advantageous Effects of Invention

It is possible to provide a magnetic tape device capable of detecting a state of a magnetic tape more accurately, a method of inspecting a magnetic tape, and a non-transitory computer readable medium.

BRIEF DESCRIPTION OF DRAWINGS

FIG. 4 is a flowchart explaining a method of inspecting a magnetic tape in the magnetic tape device according to the first example embodiment.

DESCRIPTION OF EMBODIMENTS

First Example Embodiment

Figure 1:
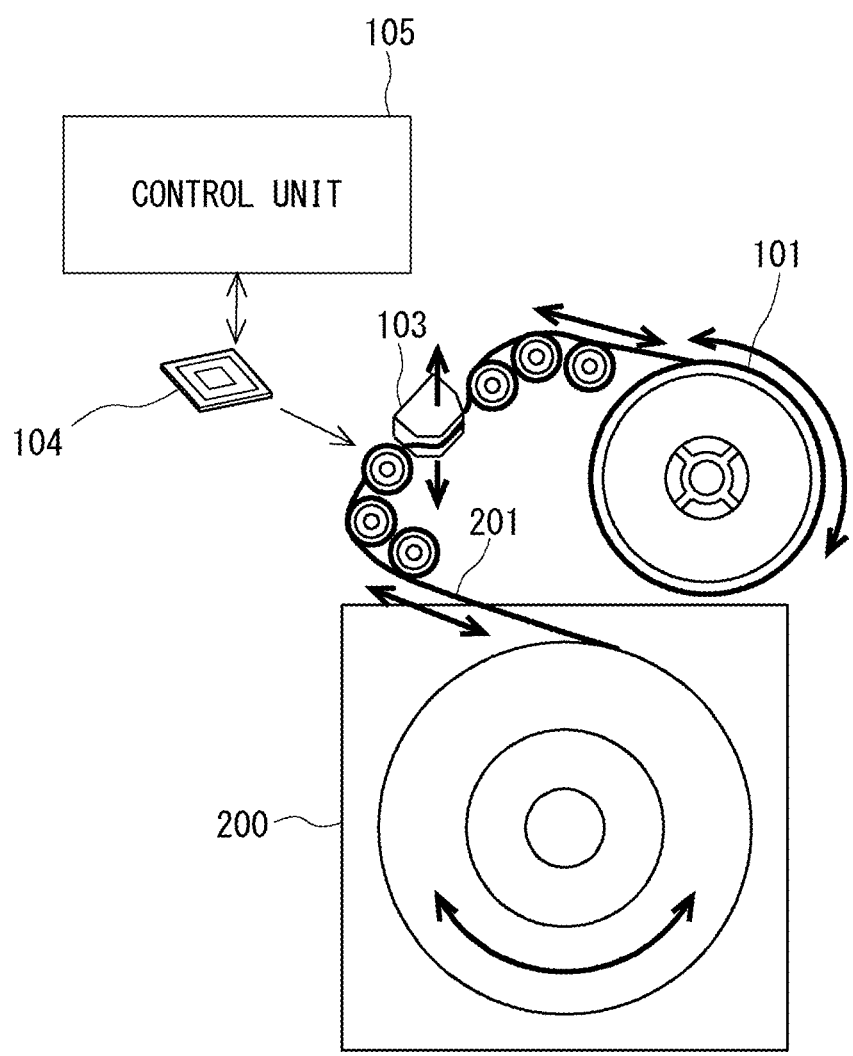
FIG. 1 is a diagram showing an example of a magnetic tape device according to a first example embodiment.

Hereinbelow, example embodiments of the present disclosure are described with reference to the drawings. FIG. 1 is a diagram showing an example of a magnetic tape device 100 according to a first example embodiment of the present disclosure.

As shown in FIG. 1, the magnetic tape device 100 according to the first example embodiment includes a winding reel 101 serving as a winding unit, a drive head 103, an image sensor 104 serving as a sensor unit, and a control unit 105.

The winding reel 101 winds a magnetic tape 201 contained in a tape cartridge 200.

Further, the drive head 103 performs at least either one of writing information onto the magnetic tape 201 and reading the information recorded on the magnetic tape.

Further, the image sensor 104 picks up an image of a surface of the magnetic tape 201 wound from the tape cartridge 200 by the winding reel 101.

Further, the control unit 105 processes the image picked up by the image sensor 104 and determines presence/absence of an abnormality on the surface of the magnetic tape 201.

Further, when the image sensor 104 picks up an image of the surface of the magnetic tape 201, the control unit 105 adjusts, in accordance with at least either one of the type of the drive head 103 and the recording density of the magnetic tape 201, a winding speed (a tape speed) at which the winding reel 101 winds the magnetic tape 201.

Specifically, when the recording density of the magnetic tape 201 is higher than the prescribed recording density, the control unit 105 adjusts the winding speed at which the winding reel 101 winds the magnetic tape 201 so that the winding speed at which the magnetic tape 201 is wound is made slow.

Further, when the winding speed suitable for the drive head 103 is faster than the prescribed speed, the control unit 105 adjusts the winding speed at which the winding reel 101 winds the magnetic tape 201 so that the winding speed at which the magnetic tape 201 is wound is made slow.

According to an example of the magnetic tape device 100 according to the first example embodiment described above, when the image sensor 104 picks up an image of the surface of the magnetic tape 201, the winding speed at which the winding reel 101 winds the magnetic tape 201 is adjusted in accordance with at least either one of the type of the drive head 103 and the recording density of the magnetic tape 201. Therefore, since the recording density of the magnetic tape 201 is high, even if the sizes of the scratches and the stains (foreign matters) that cause the errors are small, it is possible to detect such scratches and stains of smaller sizes more reliably.

Further, even in the case of the magnetic tape device 100 equipped with the drive head 103 that is relatively fast in the winding speed at which the magnetic tape is wound at the time of reading/writing, the winding speed at which the winding reel 101 winds the magnetic tape 201 is adjusted when the image sensor 104 picks up an image of the surface of the magnetic tape 201. Therefore, even in the case of the magnetic tape device 100 equipped with the drive head 103 that is relatively fast in the winding speed at which the magnetic tape 201 is wound at the time of reading/writing, it is possible to detect the scratches and the stains that cause the errors more reliably.

Accordingly, it is possible to provide the magnetic tape device 100 capable of detecting a state of the magnetic tape 201 more accurately. Therefore, when an error such as a media error occurs, the user can more easily determine whether the cause of the error is in the state of the magnetic tape 201 or in the state of the drive head 103.

Figure 2:
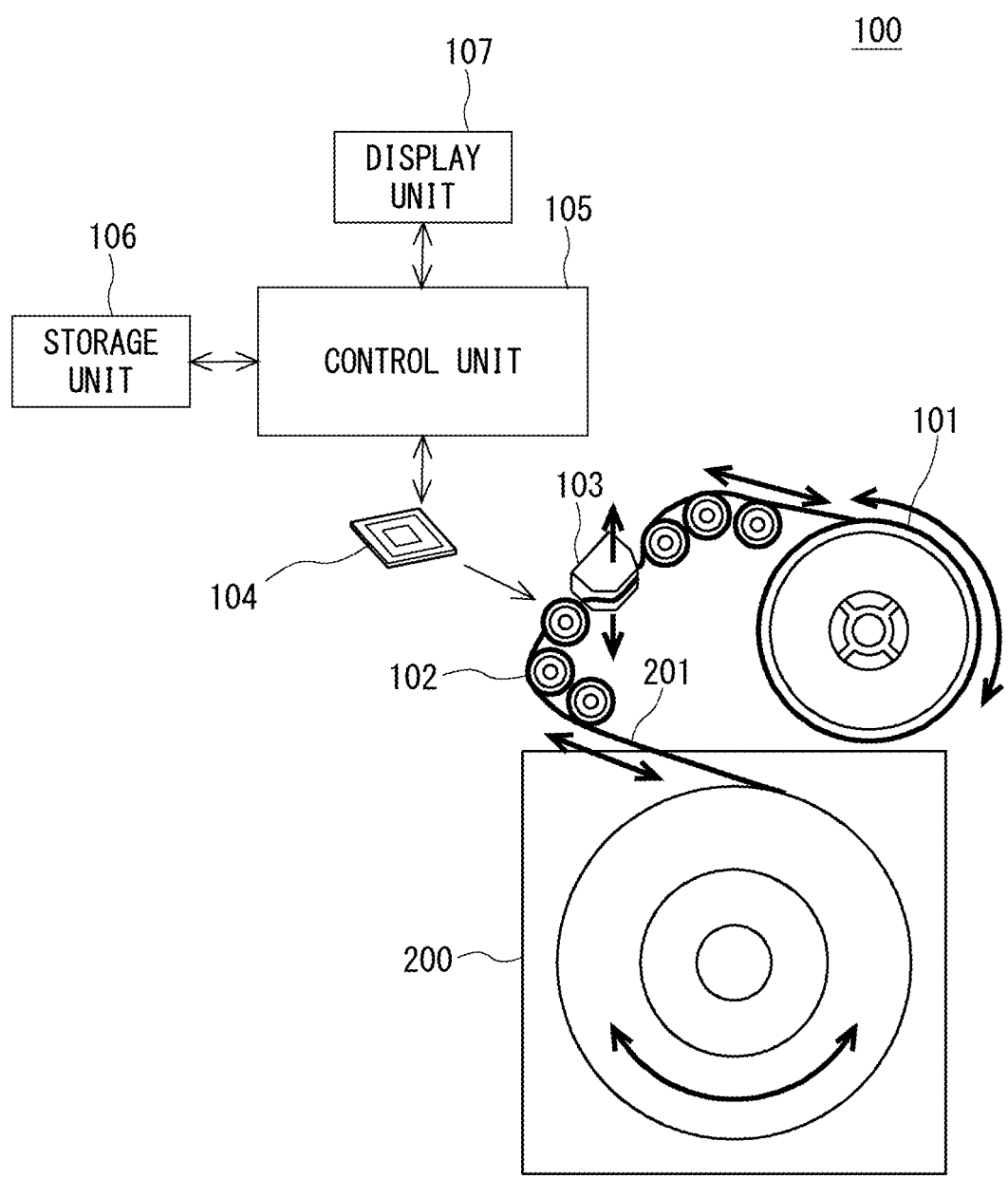
FIG. 2 is a diagram showing another example of a magnetic tape device according to the first example embodiment.
Figure 3A:
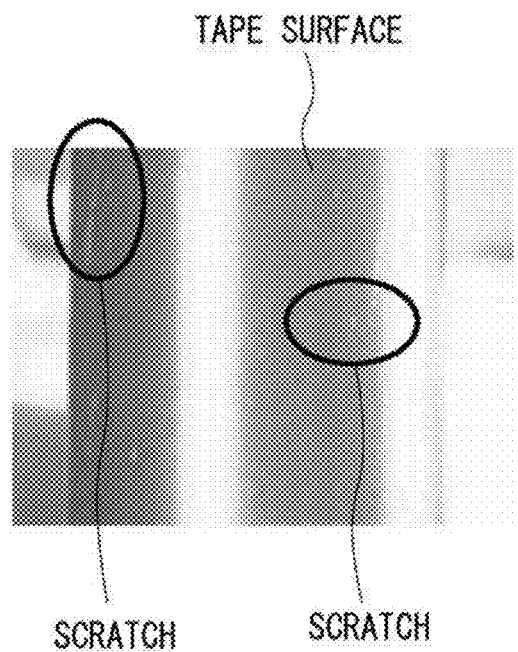
FIG. 3A is an example of a photograph of a surface of a magnetic tape taken by an image sensor of the magnetic tape device according to the first example embodiment.
Figure 3B:
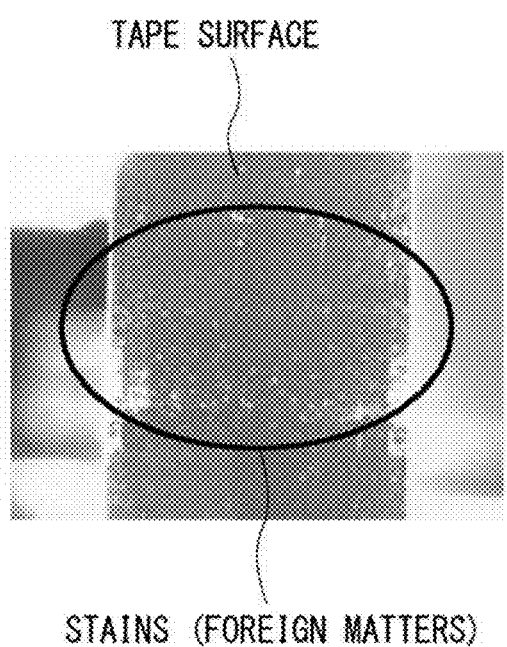
FIG. 3B is an example of a photograph of a surface of a magnetic tape taken by the image sensor of the magnetic tape device according to the first example embodiment.

Next, another example of the magnetic tape device 100 according to the first example embodiment of the present disclosure is described. FIG. 2 is a diagram showing another example of the magnetic tape device 100 according to the first example embodiment of the present disclosure. FIGS. 3A and 3B are examples of photographs of a surface of the magnetic tape 201 taken by the image sensor 104 of the magnetic tape device 100 according to the first example embodiment. FIG. 4 is a flowchart explaining a method of inspecting a magnetic tape in the magnetic tape device 100 according to the first example embodiment.

As shown in FIG. 2, the magnetic tape device 100 according to the first example embodiment includes the winding reel 101 serving as the winding unit, at least one roller 102, the drive head 103, the image sensor 104 serving as the sensor unit, the control unit 105, a storage unit 106, and a display unit 107.

The winding reel 101 winds the magnetic tape 201 contained in the tape cartridge 200 by being rotated by a motor which is not shown in the drawings. The control unit 105 controls the motor so as to adjust the speed (the winding speed) at which the winding reel 101 winds the magnetic tape 201.

The roller 102 is disposed between the winding reel 101 and the tape cartridge 200, and the roller 102 supports the magnetic tape 201 wound from the tape cartridge 200 such that the magnetic tape 201 passes the prescribed position. Further, by rotating the roller 102, the magnetic tape 201 passes through the prescribed position and is conveyed to the winding reel 101. Specifically, the position on the magnetic tape 201 that passes through the drive head 103 is adjusted by rotating the winding reel 101 and the roller 102. Accordingly, the positions on the magnetic tape 201 where the drive head 103 performs writing and reading are adjusted.

The drive head 103 performs at least either one of writing information onto the magnetic tape 201 and reading information recorded on the magnetic tape.

Specifically, the drive head 103 writes information onto the magnetic tape 201 and then reads the written information from the magnetic tape 201. Then, the control unit 105 confirms, based on the Reed-Solomon code, whether or not correct information has been written onto the magnetic tape 201 based on the information read by the drive head 103.

In the similar manner, the drive head 103 reads information from the magnetic tape 201 and then re-reads the same information from the magnetic tape 201. Then, the control unit 105 confirms, based on the Reed-Solomon code, whether or not correct information has been read from the magnetic tape 201 based on the information re-read by the drive head 103.

When writing or reading of information by the drive head 103 fails a predetermined number of times or more, the control unit 105 determines that a media error has occurred. Then, the display unit 107 of the magnetic tape device 100 displays that the media error has occurred. Note that when the magnetic tape device 100 is connected to an external device such as a higher order server or the like, the magnetic tape device 100 may notify the external device of the media error, and a display unit of the external device may display that the media error has occurred.

The image sensor 104 is, for example, a CMOS (Complementary MOS) sensor or a CCD (Charge Coupled Device) sensor used in a surveillance camera or the like, and picks up an image of a surface of the magnetic tape 201 wound from the tape cartridge 200 by the winding reel 101. When the inside of the magnetic tape device 100 is dark and hence it is difficult to perform image processing of the image picked up by the image sensor 104, a light source (omitted in the drawings) may be disposed inside the magnetic tape device 100 to irradiate the surface of the magnetic tape 201.

The image of the surface of the magnetic tape 201 is picked up by the image sensor 104 simultaneously with the writing of information onto the magnetic tape 201 and the reading of information from the magnetic tape 201 by the drive head 103.

However, depending on the type of the drive head 103 that is mounted on the magnetic tape device 100 and the type (the recording density) of the magnetic tape 201, the winding speed at which the winding reel 101 winds the magnetic tape may be too fast for the image sensor 104 to pick up an image of the surface of the magnetic tape 201. In such case, the image sensor 104 picks up an image of the surface of the magnetic tape 201 in a monitor-only mode different from the modes in which the writing of information onto the magnetic tape 201 and the reading of information from the magnetic tape 201 are performed by the drive head 103. In the monitor-only mode, the magnetic tape 201 is wound at a speed slower than the winding speed that is suitable for the type of the drive head 103 or the recording density of the magnetic tape 201, whereby the image sensor 104 picks up an image of the surface of the magnetic tape 201.

The control unit 105 is an FPGA (Field-Programmable Gate Array) or the like, and controls each part of the magnetic tape device 100 by being operated in accordance with a hardware language written in the control unit 105 in advance. Note that the control unit 105 may be one that includes a CPU which is not shown in the drawings, a storage unit which is not shown in the drawings, and so on, and all of the processing performed by the control unit 105 may be implemented by causing the CPU execute the program stored in the storage unit.

In this case, the program stored in each storage unit of the control unit 105 includes a code for implementing processing performed in each storage unit of the control unit 105 by causing the CPU execute the program. Note that the storage unit may, for example, be configured to include an arbitral storage device that can store this program or various information used for the processing performed by the control unit 105. The storage device may be, for example, a memory.

Further, the control unit 105 includes, for example, a control unit (a microprocessor) that performs control by a firmware with which the whole magnetic tape device 100 is controlled, a high-order host I/F control unit that controls the interface with the high-order host device, a formatter circuit (including a processor and a DSP) that converts data (information) to an LTO format, a buffer that temporarily stores data, an A/D convertor, a pre-amplifying unit, and a servo circuit that controls the motor.

Specifically, the control unit 105 controls the operations of the winding reel 101, the drive head 103, the image sensor 104, the display unit 107, and so on.

More specifically, the control unit 105 controls the motor (omitted in the drawings) that rotates the winding reel 101 when the drive head 103 writes information onto the magnetic tape 201 or the drive head 103 reads information from the magnetic tape 201. For example, the control unit 105 controls the motor (omitted in the drawings) that rotates the winding reel 101 so that the winding reel 101 winds the magnetic tape 201 from the tape cartridge 200 at a speed suitable for the type of the drive head 103 or suitable for the recording density of the magnetic tape 201.

Further, when the winding speed suitable for the type of the drive head 103 or suitable for the recording density of the magnetic tape 201 is too fast for the image sensor 104 to pick up an image of the surface of the magnetic tape 201, the control unit 105 carries out the monitor-only mode as necessary. For example, when a media error occurs, the control unit 105 carries out the monitor-only mode. In the monitor-only mode, the control unit 105 controls the motor (omitted in the drawings) that rotates the winding reel 101 so that the winding reel 101 winds the magnetic tape 201 at a speed slower than the speed suitable for the type of the drive head 103 or suitable for the recording density of the magnetic tape 201.

Specifically, when the recording density of the magnetic tape 201 is higher than the prescribed recording density, the control unit 105 adjusts the winding speed at which the winding reel 101 winds the magnetic tape 201 so that the winding speed at which the magnetic tape 201 is wound is made slow. Further, when the winding speed suitable for the drive head 103 is faster than the prescribed speed, the control unit 105 adjusts the winding speed at which the winding reel 101 winds the magnetic tape 201 so that the winding speed at which the magnetic tape 201 is wound is made slow.

Further, the control unit 105 controls the drive head 103 so that the drive head 103 performs at least either one of writing information onto the magnetic tape 201 and reading information recorded on the magnetic tape.

Further, when writing or reading of information by the drive head 103 fails a predetermined number of times or more, the control unit 105 determines that a media error has occurred. And, when a media error occurs, the control unit 105 controls the display unit 107 so as to display that the media error has occurred. Note that when the magnetic tape device 100 is connected to an external device such as a higher-order server or the like, the control unit 105 may notify the external device of the media error. For example, the control unit 105 notifies an SCSI (Small Computer System Interface) command control unit (omitted in the drawings), which is an interface between the magnetic tape device 100 and the external device, of the media error. Accordingly, an external device is notified of the media error by the SCSI command attention.

Further, the control unit 105 determines presence/absence of an abnormality on the surface of the magnetic tape 201 by performing image processing on the image picked up by the image sensor 104.

Specifically, the control unit 105 detects the scratches or the stains present on the surface of the magnetic tape 201 by performing image processing on the image picked up by the image sensor 104.

Then, when the sizes of the scratches or the stains that are detected are equal to or larger than the prescribed sizes, the control unit 105 determines that there is an abnormality on the surface of the magnetic tape 201. Here, the prescribed sizes may be determined in accordance with the recording density of the magnetic tape 201.

Further, the control unit 105 determines whether or not the detected stains are viscous based on the shapes of the detected stains, and determines that there is an abnormality on the surface of the magnetic tape 201 when it determines that the stains are viscous.

Further, when the number of the scratches or the number of the stains that are detected is equal to or larger than the prescribed number, the control unit 105 determines that there is an abnormality on the surface of the magnetic tape 201. Here, the prescribed number may be determined in accordance with the type of the drive head 103 or the recording density of the magnetic tape 201.

Further, when the control unit 105 determines that there is an abnormality on the surface of the magnetic tape 201, it controls the display unit 107 so as to display the presence of the abnormality. Further, when the magnetic tape device 100 is connected to an external device such as the higher-order server or the like, the control unit 105 notifies the external device of the abnormality. For example, the control unit 105 notifies the SCSI command control unit (omitted in the drawings), which is an interface between the magnetic tape device 100 and the external device, of the abnormality. Accordingly, the external device is notified of the presence of an abnormality on the surface of the magnetic tape 201 by the SCSI command attention.

The storage unit 106 temporarily stores the image of the surface of the magnetic tape 201 acquired by the image sensor 104 across the overall length of the magnetic tape 201. Accordingly, the control unit 105 can read out, from the storage unit 106, an image at a desired position of the magnetic tape 201 from among the images across the overall length of the magnetic tape 201 at a desired timing. Thus, the control unit 105 can determine the state of the surface of the magnetic tape 201 across the overall length thereof. Further, the storage unit 106 may temporarily store the result of the image processing performed by the control unit 105.

When the control unit 105 determines that there is an abnormality on the surface of surface of the magnetic tape 201, the display unit 107 displays the presence of the abnormality.

Further, when a media error occurs, the display unit 107 displays that the media error has occurred.

For example, when the display unit 107 is an LED (Light Emitting Diode) provided to the magnetic tape device 100, the display unit 107 displays the presence of an abnormality or the occurrence of a media error by turning on the LED.

FIGS. 3A and 3B show examples of photographs of the surface of the magnetic tape 201 taken by the image sensor 104. FIG. 3A shows that there are scratches on the surface of the magnetic tape 201. Further, FIG. 3B shows that there are stains (foreign matters) on the surface of the magnetic tape 201. As shown in FIGS. 3A and 3B, there are a variety of scratches and stains on the surface of the magnetic tape 201 ranging from those having sizes that can be observed visually to those having sizes that cannot be observed visually and detected as a result of the image processing performed by the control unit 105.

Next, the method of inspecting the magnetic tape 201 in the magnetic tape device 100 according to the example embodiment is described with reference to FIG. 4.

First, the control unit 105 determines whether or not the image of the surface of the magnetic tape 201 picked up by the image sensor 104 is stored in the storage unit 106 (Step S101).

Note that when the drive head 103 writes information on the magnetic tape 201 and when the drive head 103 reads information from the magnetic tape, the image sensor 104 picks up an image of the surface of the magnetic tape 201.

However, when the winding speed at which the winding reel 101 winds the magnetic tape 201 is too fast for the image sensor 104 to pick up an image of the surface of the magnetic tape 201, the image sensor 104 picks up an image of the surface of the magnetic tape 201 in the monitor-only mode. In the monitor-only mode, the winding reel 101 winds the magnetic tape 201 at a speed slower than the winding speed that is suitable for the type of the drive head 103 or the recording density of the magnetic tape 201, whereby the image sensor 104 picks up an image of the surface of the magnetic tape 201. Specifically, the control unit 105 determines whether or not the winding speed suitable for the type of the drive head 103 or suitable for the recording density of the magnetic tape 201 is too fast for the image sensor 104 to pick up an image of the surface of the magnetic tape 201. Specifically, the control unit 105 determines whether or not the recording density of the magnetic tape 201 is higher than the prescribed recording density, or whether or not the winding speed suitable for the drive head 103 is faster than the prescribed speed. Then, when the recording density of the magnetic tape 201 is higher than the prescribed recording density, the control unit 105 adjusts the winding speed at which the winding reel 101 winds the magnetic tape 201 so that the winding speed at which the magnetic tape 201 is wound is made slow. Further, when the winding speed suitable for the drive head 103 is faster than the prescribed speed, the control unit 105 adjusts the winding speed at which the winding reel 101 winds the magnetic tape 201 so that the winding speed at which the magnetic tape 201 is wound is made slow.

In Step S101, the control unit 105 repeats the processing of Step S101 when the image of the surface of the magnetic tape 201 picked up by the image sensor 104 is not stored in the storage unit 106 (Step S101; No).

In Step S101, when the image of the surface of the magnetic tape 201 picked up the image sensor 104 is stored in the storage unit 106 (Step S101; Yes), the control unit 105 performs image processing on the image and determines whether or not there are scratches or stains on the magnetic tape 201 by performing image processing on the image (Step S102). In other words, the control unit 105 determines whether or not scratches or stains are detected from the image of the surface of the magnetic tape 201 as a result of the image processing.

In Step S102, when there are no scratches or stains on the magnetic tape 201 (Step S102; No), the control unit 105 proceeds to the processing of Step S107.

In Step S102, when there are scratches or stains on the magnetic tape 201 (Step S102; Yes), the control unit 105 determines whether or not the sizes of the scratches or the stains are equal to or larger than the prescribed sizes (Step S103).

In Step S103, when the sizes of the scratches or the stains that are detected are equal to or larger than the prescribed sizes (Step S103; Yes), the control unit 105 proceeds to the processing of Step S106.

In Step S103, when the sizes of the scratches or the stains that are detected are smaller than the prescribed sizes (Step S103; No), the control unit 105 determines whether or not the stains are viscous (Step S104). Specifically, the control unit 105 determines whether or not the stains are viscous based on the shapes of the stains.

In Step S104, when the stains are viscous (Step S104; Yes), the control unit 105 proceeds to the process of Step S106.

In Step S104, when the stains are not viscous (Step S104; No), the control unit 105 determines whether or not the number of the scratches or the number of the stains within the prescribed length of the magnetic tape 201 (the prescribed tape length) is equal to or larger than the prescribed number (Step S105).

In Step S105, when there are the prescribed number or more of the scratches or the prescribed number or more of the stains within the prescribed length of the magnetic tape 201 (the prescribed tape length) (Step S105; Yes), the display unit 107 displays that there is an abnormality on the surface of the magnetic tape 201 (Step S106). Further, when the magnetic tape device 100 is connected to an external device such as the higher-order server or the like, the control unit 105 notifies the external device of the abnormality (Step S106).

In Step S105, when there are less than the prescribed number of the scratches or less than the prescribed number of the stains within the prescribed length of the magnetic tape 201 (the prescribed tape length) (Step S105; No), the control unit 105 determines whether or not the image at the next position of the magnetic tape 201 is stored in the storage unit 106 (Step S107).

Note that the prescribed tape length is, for example, the length of the magnetic tape 201 that fits in one image picked up the image sensor 104.

In Step S107, when the image at the next position of the magnetic tape 201 is stored in the storage unit 106 (Step S107; Yes), the control unit 105 proceeds to Step S102.

In Step S107, when the image at the next position of the magnetic tape 201 is not stored in the storage unit 106 (Step S107; No), the control unit 105 determines that the end (the tape end) of the magnetic tape 201 has been reached and ends the process.

As described above, according to other examples of the magnetic tape device 100 according to the first example embodiment and the method of inspecting the magnetic tape 201, when the image sensor 104 picks up an image of the surface of the magnetic tape 201, the winding speed at which the winding reel 101 winds the magnetic tape 201 is adjusted in accordance with at least either one of the type of the drive head 103 and the recording density of the magnetic tape 201, likewise the example of the magnetic tape device 100 shown in FIG. 1. Accordingly, it is possible to provide the magnetic tape device 100 capable of detecting a state of the magnetic tape 201 more accurately. Therefore, when an error such as a media error occurs, the user can more easily determine whether the cause of the error is in the state of the magnetic tape 201 or in the state of the drive head 103.

Further, the magnetic tape device 100 includes the display unit 107 that displays the presence of an abnormality when the control unit 105 determines that there is an abnormality on the surface of the magnetic tape 201. Accordingly, the user of the magnetic tape device 100 can recognize that there is an abnormality on the surface of the magnetic tape 201 by confirming the display of the display unit 107.

Further, the control unit 105 determines that there is an abnormality on the surface of the magnetic tape 201 when the sizes of the scratches or the stains detected from the picked-up image of the surface of the magnetic tape 201 are equal to or larger than the prescribed sizes. Accordingly, the scratches and the stains present on the surface of the magnetic tape 201 can be detected more reliably. For example, by determining the prescribed sizes in accordance with the recording density of the magnetic tape 201, even when the sizes of the scratches and the stains that cause the errors become smaller as the recording density of the magnetic tape 201 becomes higher, it is possible to detect such scratches and errors more reliably.

Further, the control unit 105 determines whether or not the stains detected from the picked-up image of the surface of the magnetic tape 201 are viscous based on the shapes of the detected stains, and determines that there is an abnormality on the surface of the magnetic tape 201 when it determines that the stains are viscous. Accordingly, it is possible to detect, from among the stains that are present on the surface of the magnetic tape 201, the stains that affect the reading and the writing of information by the drive head 103 more reliably. Further, even when there are stains on the surface of the magnetic tape 201, the control unit 105 determines that there is no abnormality on the surface of the magnetic tape 201 when the stains are non-viscous stains that can be removed relatively easily by performing head cleaning or the like. Accordingly, the control unit 105 does not need to make an unnecessary determination that there is an abnormality on the surface of the magnetic tape 201.

Further, the control unit 105 determines that there is an abnormality on the surface of the magnetic tape 201 when the number of the scratches or the number of the stains detected from the picked-up image of the surface of the magnetic tape 201 is equal to or larger than the prescribed number. Accordingly, when there are scratches or stains on the surface of the magnetic tape 201 by the number that causes errors such as media errors, the control unit 105 can determine that there is an abnormality on the surface of the magnetic tape 201. For example, the prescribed number is determined in accordance with the type of the drive head 103 or the recording density of the magnetic tape 201. Accordingly, even when errors occur due to a small number of scratches and a small number of stains depending on the type of the drive head 103 or the recording density of the magnetic tape 201, it is possible to detect such scratches and stains more reliably.

In the example embodiments described above, the present disclosure has been described as a hardware configuration, however, the present disclosure is not limited thereto. The present disclosure can be realized by performing the processes shown in the flowchart of FIG. 4 by causing a CPU (Central Processing Unit) execute a computer program. Further, the program mentioned above can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The whole or part of the example embodiments disclosed above can be described as, but not limited to, the following supplementary notes.

(Supplementary Note 1)

A magnetic tape device comprising:

a winding unit configured to wind a magnetic tape;

a drive head configured to perform at least either one of writing information onto the magnetic tape and reading the information recorded on the magnetic tape;

a sensor unit configured to pick up an image of a surface of the magnetic tape; and a control unit configured to perform image processing on the image picked up by the sensor unit and to determine presence/absence of an abnormality on the surface of the magnetic tape, wherein the control unit adjusts, in accordance with at least either one of a type of the drive head and a recording density of the magnetic tape, a winding speed at which the magnetic tape is wound by the winding unit when the sensor unit picks up the image of the surface of the magnetic tape.

(Supplementary Note 2)

The magnetic tape device described in Supplementary note 1, further comprising a display unit configured to display the presence of the abnormality when the control unit determines the presence of the abnormality on the surface of the magnetic tape.

(Supplementary Note 3)

The magnetic tape device described in Supplementary note 1 or 2, wherein the control unit determines the presence of the abnormality on the surface of the magnetic tape when a size of a scratch or a size of a stain detected from the picked-up image of the surface of the magnetic tape is equal to or larger than a prescribed size.

(Supplementary Note 4)

The magnetic tape device described in any one of Supplementary notes 1 to 3, wherein the control unit determines whether or not the stain detected from the picked-up image of the surface of the magnetic tape is viscous based on a shape of the detected stain, and determines the presence of the abnormality on the surface of the magnetic tape when the stain is determined to be viscous.

(Supplementary Note 5)

The magnetic tape device described in any one of Supplementary notes 1 to 4, wherein the control unit determines the presence of the abnormality on the surface of the magnetic tape when a number of the scratches or a number of the stains detected from the picked-up image of the surface of the magnetic tape is equal to or larger than a prescribed number.

(Supplementary Note 6)

A method of inspecting a magnetic tape comprising: winding a magnetic tape;

picking up an image of a surface of the magnetic tape; performing image processing on the picked-up image and determining presence/absence of an abnormality on the surface of the magnetic tape; and adjusting, in accordance with at least either one of a type of a drive head and a recording density of the magnetic tape, a winding speed at which the magnetic tape is wound when picking up the image of the surface of the magnetic tape.

(Supplementary Note 7)

The method of inspecting the magnetic tape described in Supplementary note 6, wherein the presence of the abnormality is displayed when it is determined that the abnormality is present on the surface of the magnetic tape.

(Supplementary Note 8)

The method of inspecting the magnetic tape described in Supplementary note 6 or 7, wherein the presence of the abnormality on the surface of the magnetic tape is determined when a size of a scratch or a size of a stain detected from the picked-up image of the surface of the magnetic tape is equal to or larger than a prescribed size.

(Supplementary Note 9)

The method of inspecting the magnetic tape described in any one of Supplementary notes 6 to 8, wherein whether or not the stain detected from the picked-up image of the surface of the magnetic tape is viscous is determined based on a shape of the stain, and the presence of the abnormality on the surface of the magnetic tape is determined when the stain is determined to be viscous.

(Supplementary Note 10)

The method of inspecting the magnetic tape described in any one of Supplementary notes 6 to 9, wherein the presence of the abnormality on the surface of the magnetic tape is determined when a number of the scratches or a number of the stains detected from the picked-up image of the surface of the magnetic tape is equal to or larger than a prescribed number.

(Supplementary Note 11)

A program for causing a control unit to execute the processes of: winding a magnetic tape by a winding unit;

picking up an image of a surface of the magnetic tape by a sensor unit; performing image processing on the image picked up by the sensor unit and determining presence/absence of an abnormality on the surface of the magnetic tape; and adjusting, in accordance with at least either one of a type of a drive head and a recording density of the magnetic tape, a winding speed at which the magnetic tape is wound by the winding unit when the sensor unit picks up the image of the surface of the magnetic tape.

(Supplementary Note 12)

The program described in Supplementary note 11 for causing the control unit to execute the process of displaying the presence of the abnormality by the display unit when the control unit determines the presence of the abnormality on the surface of the magnetic tape.

(Supplementary Note 13)

The program described in Supplementary note 11 or 12 for causing the control unit to execute the process of determining the presence of the abnormality on the surface of the magnetic tape when a number of scratches or a number of stains detected from the picked-up image of the surface of the magnetic tape is equal to or larger than a prescribed number.

(Supplementary Note 14)

The program described in any one of Supplementary notes 11 to 13 for causing the control unit to execute the process of determining whether or not the stain detected from the picked-up image of the surface of the magnetic tape is viscous based on a shape of the stain, and determining the presence of the abnormality on the surface of the magnetic tape when the stain is determined to be viscous.

(Supplementary Note 15)

The program described in any one of Supplementary notes 11 to 14 for causing the control unit to execute the process of determining the presence of the abnormality on the surface of the magnetic tape when the number of the scratches or the number of the stains detected from the picked-up image of the surface of the magnetic tape is equal to or larger than the prescribed number.

The present disclosure has been described above with reference to the example embodiments. However, the present disclosure is not to be limited to the above example embodiments. Note that the configuration and the details of the present disclosure can be changed in various ways within the scope of the present disclosure that can be understood by a skilled person.

This application is based upon and claims the benefit of priority from Japanese patent application No. 2018-065058, filed on Mar. 29, 2018, the disclosure of which is incorporated herein in its entirety by reference.

INDUSTRIAL APPLICABILITY

It is possible to provide a magnetic tape device capable of detecting a state of a magnetic tape more accurately, a method of inspecting a magnetic tape, and a non-transitory computer readable medium.

REFERENCE SIGNS LIST

100 MAGNETIC TAPE DEVICE
101 WINDING REEL (WINDING UNIT)

102 ROLLER
103 DRIVE HEAD
104 IMAGE SENSOR (SENSOR UNIT)
105 CONTROL UNIT
106 STORAGE UNIT
107 DISPLAY UNIT
200 TAPE CARTRIDGE
201 MAGNETIC TAPE

What is claimed is:

1. A magnetic tape device comprising:
a winding unit configured to wind a magnetic tape;
a drive head configured to perform at least either one of writing information onto the magnetic tape and reading the information recorded on the magnetic tape;
a sensor unit configured to pick up an image of a surface of the magnetic tape; and
a control unit configured to perform image processing on the image picked up by the sensor unit and to determine presence/absence of an abnormality on the surface of the magnetic tape, wherein
the control unit adjusts, in accordance with at least either one of a type of the drive head and a recording density of the magnetic tape, a winding speed at which the magnetic tape is wound by the winding unit when the sensor unit picks up the image of the surface of the magnetic tape.

2. The magnetic tape device according to claim 1, further comprising a display unit configured to display the presence of the abnormality when the control unit determines the presence of the abnormality on the surface of the magnetic tape.

3. The magnetic tape device according to claim 1, wherein the control unit determines the presence of the abnormality on the surface of the magnetic tape when a size of a scratch or a size of a stain detected from the picked-up image of the surface of the magnetic tape is equal to or larger than a prescribed size.

4. The magnetic tape device according to claim 1, wherein the control unit determines whether or not the stain detected from the picked-up image of the surface of the magnetic tape is viscous based on a shape of the detected stain, and determines the presence of the abnormality on the surface of the magnetic tape when the stain is determined to be viscous.

5. The magnetic tape device according claim 1, wherein the control unit determines the presence of the abnormality on the surface of the magnetic tape when a number of the scratches or a number of the stains detected from the picked-up image of the surface of the magnetic tape is equal to or larger than a prescribed number.

6. A method of inspecting a magnetic tape comprising:
winding a magnetic tape;
picking up an image of a surface of the magnetic tape;
performing image processing on the picked-up image and determining presence/absence of an abnormality on the surface of the magnetic tape; and
adjusting, in accordance with at least either one of a type of a drive head and a recording density of the magnetic tape, a winding speed at which the magnetic tape is wound when picking up the image of the surface of the magnetic tape.

7. The method of inspecting the magnetic tape according to claim 6, wherein the presence of the abnormality is displayed when it is determined that the abnormality is present on the surface of the magnetic tape.

8. The method of inspecting the magnetic tape according claim 6, wherein the presence of the abnormality on the surface of the magnetic tape is determined when a size of a scratch or a size of a stain detected from the picked-up image of the surface of the magnetic tape is equal to or larger than a prescribed size.

9. The method of inspecting the magnetic tape according to claim 6, wherein whether or not the stain detected from the picked-up image of the surface of the magnetic tape is viscous is determined based on a shape of the stain, and the presence of the abnormality on the surface of the magnetic tape is determined when the stain is determined to be viscous.

10. The method of inspecting the magnetic tape according to claim 6, wherein the presence of the abnormality on the surface of the magnetic tape is determined when a number of the scratches or a number of the stains detected from the picked-up image of the surface of the magnetic tape is equal to or larger than a prescribed number.

11. A non-transitory computer readable medium configured to store a program for causing a control unit to execute the processes of:
winding a magnetic tape by a winding unit;
picking up an image of a surface of the magnetic tape by a sensor unit;
performing image processing on the image picked up by the sensor unit and determining presence/absence of an abnormality on the surface of the magnetic tape; and
adjusting, in accordance with at least either one of a type of a drive head and a recording density of the magnetic tape, a winding speed at which the magnetic tape is wound by the winding unit when the sensor unit picks up the image of the surface of the magnetic tape.

12. The non-transitory computer readable medium configured to store the program according to claim 11 for causing the control unit to execute the process of displaying the presence of the abnormality by the display unit when the control unit determines the presence of the abnormality on the surface of the magnetic tape.

13. The non-transitory computer readable medium configured to store the program according to claim 11 for causing the control unit to execute the process of determining the presence of the abnormality on the surface of the magnetic tape when a number of scratches or a number of stains detected from the picked-up image of the surface of the magnetic tape is equal to or larger than a prescribed number.

14. The non-transitory computer readable medium configured to store the program according to claim 11 for causing the control unit to execute the process of determining whether or not the stain detected from the picked-up image of the surface of the magnetic tape is viscous based on a shape of the stain, and determining the presence of the abnormality on the surface of the magnetic tape when the stain is determined to be viscous.

15. The non-transitory computer readable medium configured to store the program according to claim 11 for causing the control unit to execute the process of determining the presence of the abnormality on the surface of the magnetic tape when the number of the scratches or the number of the stains detected from the picked-up image of the surface of the magnetic tape is equal to or larger than the prescribed number.

* * * * *